United States Patent
Larochelle et al.

(10) Patent No.: US 10,302,181 B2
(45) Date of Patent: May 28, 2019

(54) RECONFIGURABLE MOTION GENERATOR

(71) Applicant: South Dakota School of Mines and Technology, Rapid City, SD (US)

(72) Inventors: Pierre Larochelle, West Melbourne, FL (US); Venkatesh Venkataramanujam, Woburn, MA (US)

(73) Assignee: South Dakota School of Mines and Technology, Rapid City, SD (US)

( * ) Notice: Subject to any disclaimer, the term of this patent is extended or adjusted under 35 U.S.C. 154(b) by 627 days.

(21) Appl. No.: 14/702,430

(22) Filed: May 1, 2015

(65) Prior Publication Data

US 2015/0316129 A1    Nov. 5, 2015

Related U.S. Application Data

(60) Provisional application No. 61/987,153, filed on May 1, 2014.

(51) Int. Cl.
  *B25J 9/00*  (2006.01)
  *F16H 21/52*  (2006.01)
  *F16H 21/40*  (2006.01)
  *G05G 21/00*  (2006.01)
  *B25J 9/10*  (2006.01)

(52) U.S. Cl.
  CPC ............. *F16H 21/52* (2013.01); *B25J 9/106* (2013.01); *F16H 21/40* (2013.01); *G05G 21/00* (2013.01); *Y10T 74/18232* (2015.01)

(58) Field of Classification Search
  CPC .................................. B25J 9/106; F16H 21/40

USPC .............................................. 700/275; 74/47
See application file for complete search history.

(56) References Cited

U.S. PATENT DOCUMENTS 4,547,119 A * 10/1985 Chance .................... B25J 9/045
                                                        414/690
5,673,595 A * 10/1997 Hui .......................... B25J 9/106
                                                        414/680

(Continued)

OTHER PUBLICATIONS

Gogu, Grigore. "Structural synthesis of fully-isotropic translational parallel robots via theory of linear transformations." European Journal of Mechanics-A/Solids 23.6 (2004): 1021-1039. (Year: 2004).*

(Continued)

*Primary Examiner* — Michael D Masinick
(74) *Attorney, Agent, or Firm* — Stephen Thomas

(57) ABSTRACT

A reconfigurable motion generator and control system for multi-phase motion generation. Reconfigurable motion generators are a new class of mechanical devices that are designed for a specific part family and their associated motion generation tasks. The reconfigurable motion generator may utilize revolute joints for link length and pivot adjustment to achieve different configurations from the same set of links. Due to the nature of adjustment of the mechanism this methodology may be used for different types of motion generation tasks such as (a) common start position, (b) common end position, (c) common intermediate position, and (d) distinct motion generation tasks with no common positions. This technique can be applied towards the synthesis of reconfigurable motion generators for use in many planar or spherical applications involving multi-phase function, path, and motion generation tasks.

20 Claims, 13 Drawing Sheets

(56) References Cited

U.S. PATENT DOCUMENTS

| | | | | |
|---|---|---|---|---|
| 5,816,105 | A * | 10/1998 | Adelstein | B25J 9/106 74/471 XY |
| 6,116,844 | A * | 9/2000 | Hayward | B25J 9/106 414/680 |
| 2002/0043950 | A1 * | 4/2002 | Yim | B25J 9/08 318/560 |
| 2009/0139830 | A1 * | 6/2009 | Gonzalez Alemany | B65G 23/16 198/321 |

OTHER PUBLICATIONS

Johnson, G. R., et al. "The design of a five-degree-of-freedom powered orthosis for the upper limb." Proceedings of the Institution of Mechanical Engineers, Part H: Journal of Engineering in Medicine 215.3 (2001): 275-284. (Year: 2001).*

* cited by examiner

RECONFIGURABLE MOTION GENERATOR

CROSS REFERENCE TO RELATED APPLICATIONS

This non-provisional application for patent filed in the United States Patent and Trademark Office (USPTO) under 35 U.S.C. § 111(a) claims the benefit of provisional application Ser. No. 61/987,153, which was filed in the USPTO on May 1, 2014, and which is incorporated herein in its entirety by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

FIELD OF INVENTION

This invention relates to the field of mechanical devices. Specifically the invention relates to Reconfigurable Motion Generators (RMGs) for multi-phase motion generation. Reconfigurable Motion Generators are a new class of mechanical devices that are designed for a specific part family and their associated motion generation tasks.

BACKGROUND OF THE INVENTION

Reconfigurable Motion Generators are capable of configuration changes according to variations in the motion generation requirements. Thus, Reconfigurable Motion Generators bridge the gap between the relatively high flexibility and high cost of totally flexible machines (e.g. industrial robots) and the low flexibility and low cost of fully dedicated mechanisms (e.g. cams & linkages).

Traditional hard automation linkage or cam driven mechanisms provide an extremely high speed capability at a relatively low cost. This is desirable for automation tasks that are not expected to change (i.e hard). However in automation tasks where there is a requirement for flexibility in the motion generation tasks (i.e. soft), these machines are inadequate and call for the implementation of multi degree of freedom serial chain manipulators.

Multi degree-of-freedom serial chain manipulators offer more flexibility and have the ability to adapt to a variety of divergent tasks, however they are expensive to procure and maintain and have relatively longer cycle times. In most industrial operations the requirements for flexibility in operations are very limited. A typical serial chain robot may be only used for a few distinct pick and place operations throughout its operational life. This results in inadequate utilization of the robot.

There is a need for a new class of mechanical devices that offer the speed of hard automation mechanisms while also offering the type of operational flexibility found in serial chain manipulators.

SUMMARY OF INVENTION

The invention includes Reconfigurable Motion Generators (RMGs) for multi-phase motion generation tasks that may be deployed in various automated manufacturing environments.

Reconfigurable motion generators are a new class of mechanical devices that use only one actuator to achieve complex multi-phase motions of the end-effector attached to the coupler. The reconfigurable motion generator mechanism of the invention may replace the current complex and expensive serial chain robots and offers a cheap and robust design that can be used, for example and not by way of limitation, in pick-and-place operations in industry. The following applications are some of the applications that can benefit from the extremely precise and rapid motions that can be achieved by reconfigurable motion generators, and are presented here as exemplary of the many applications that can benefit from the use of reconfigurable motion generators: 1) pick-and-place operations involving high speed and low loads; 2) welding, machining and polishing operations; 3) robotic manipulation, vision and inspection; and 4) production and assembly of families of products that have slight changes in geometry and dimensions.

Reconfigurable motion generators are not without limitations. Reconfigurable motion generators may be designed based on specific geometries and needs of the anticipated application and the rigid body motion task that is desired by the user, which may involve dimensional synthesis of the parameters for a reconfigurable motion generator of the invention to be utilized for a specific application. This synthesis task, however, may be simplified and made easier by the implementation of Computer Aided Design (CAD) and synthesis software that may allow faster and more efficient design of an application-specific reconfigurable motion generator.

Reconfigurable motion generators may also limited by the wired connections to the brakes which limit the rotation of the input link. This has been overcome by implementing, in alternate embodiments of the invention, both wired and wireless brake control.

The invention may comprise revolute joints (R joint) for link length and pivot adjustment to achieve different configurations of the reconfigurable motion generator of the invention from the same set of links. A revolute joint is defined as a joint with one degree of freedom. This approach is preferred, since revolute joints are relatively easy to manufacture and maintain. Due to the ability of the mechanism of the reconfigurable motion generator of the invention to be adjusted, a reconfigurable motion generator of the invention may be adapted for use to execute differing motion generation tasks, for example and not by way of limitation, (a) common start position, (b) common end position, (c) common intermediate position, and (d) distinct motion generation tasks with no common positions. This adaptability of the invention can be applied towards the synthesis of reconfigurable motion generators for use in many applications involving multi-phase function, path, and motion generation tasks.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
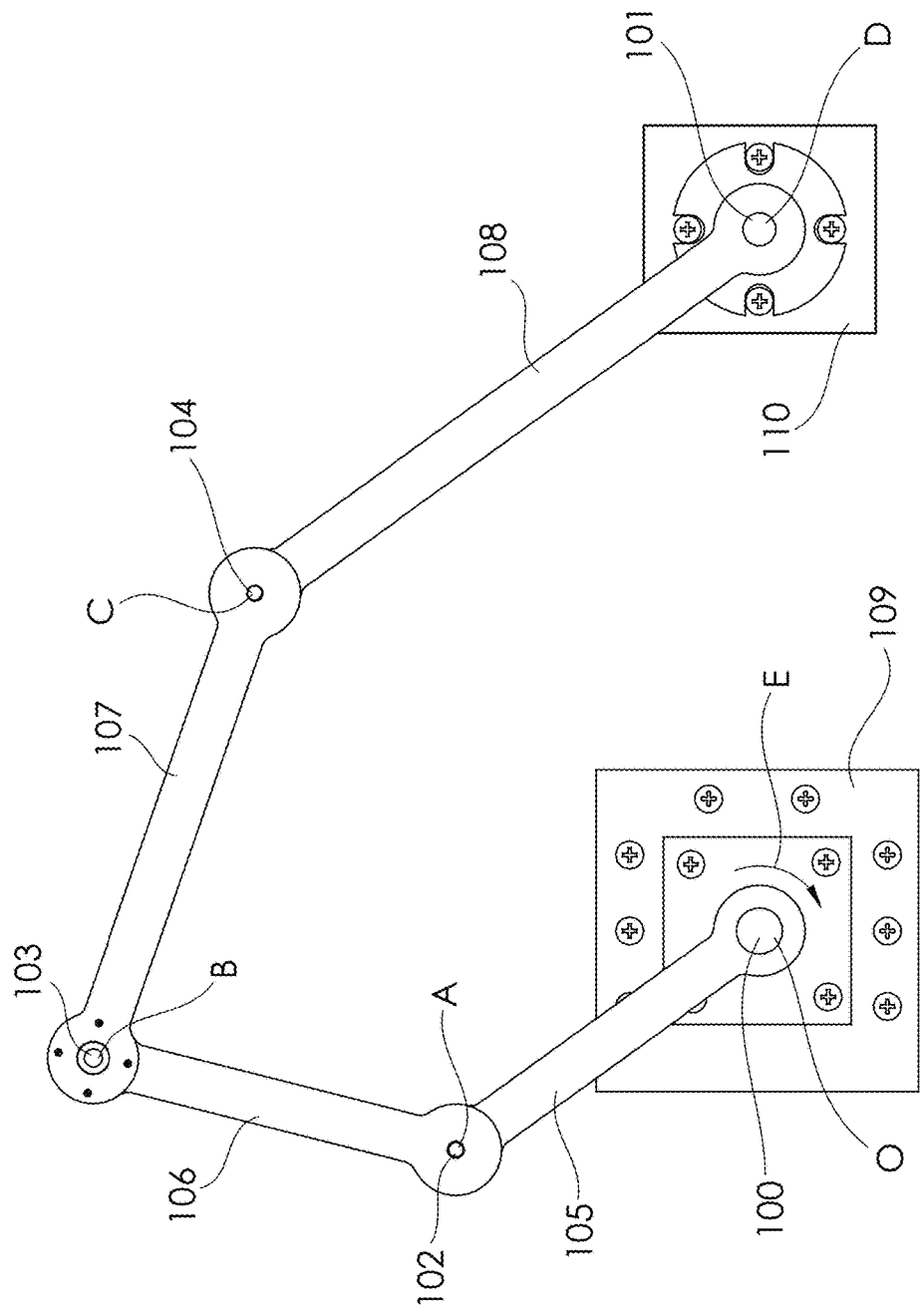
FIG. 1 is an illustrative exemplary four link reconfigurable motion generator for multi-phase motion generation tasks comprising revolute joints with brakes and a motor.

In the following detailed description of the various embodiments of the reconfigurable motion generator of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Also, in the following detailed description of the invention, references to certain publication, listed below, are made. All publications below, including but not limited to patents and patent applications cited in this specification, are specifically and individually incorporated by reference in their entirety as though fully set forth herein:

[1] H. Boyang and A. G. Erdman. A method for adjustable planar and spherical four-bar linkage synthesis. Journal of Mechanical Design, 127(3):456-463, 2005;

[2] T. Chuenchom. Kinematic Synthesis of Adjustable Robotic Mechanisms. PhD thesis, The University of Michigan, USA, 1993;

[3] T. Chuenchom and S. Kota. Analytical synthesis of adjustable dyads and triads for designing adjustable mechanisms. In American Society of Mechanical Engineers, Design Engineering Division, volume 70, pages 467-478, Minneapolis, Minn., USA, 1994;

[4] T. Chuenchom and S. Kota. Synthesis of programmable mechanisms using adjustable dyads. Journal of Mechanical Design, 119(2):232-237, 1997;

[5] S. Kim. Adjustable manipulability of closed-chain mechanisms through joint freezing and joint unactuation. In IEEE International Conference on Robotics and Automation, volume 3, pages 2627-2632, May 1998;

[6] S. Kim and J. G. Choi Improved task adaptability of open/closed chain mechanisms through continuous joint mode conversion. In Intelligent Robots and Systems, 1999. IROS '99. Proceedings. 1999 IEEE/RSJ International Conference on, volume 3, pages 1380-1385, 1999;

[7] S. Kota. Arms for low-cost semi-flexible automation. In Robotics Today, volume 4(1), pages 1-2. 1991;

[8] S. Kota and T. Chuenchom. Adjustable robotic mechanisms for low-cost automation. In ASME Design Technical Conferences, volume 26, pages 297-306, Chicago, Ill., USA, 1990;

[9] S. Kota and A. G. Erdman. Motion control in product design. Mechanical Engineering, 119(8):74-77, 1997;

[10] V. Krovi, G. Ananthasuresh, and V. Kumar. Kinematic and kinetostatic synthesis of planar coupled serial chain mechanisms. *Journal of Mechanical Design, Transactions of the ASME*, 124(2):301-312, 2002;

[11] C. H. Kuo, J. S. Dai, and H. S. Yan. Reconfiguration principles and strategies for reconfigurable mechanisms. In *Reconfigurable Mechanisms and Robots, 2009. ReMAR 2009. ASME/IFToMM International Conference on*, pages 1-7, 2009;

[12] G. S. Soh and J. M. McCarthy. Parametric design of aspherical eight-bar linkage based on a spherical parallel manipulator. *Journal of Mechanisms and Robotics*, 1(1):1-8, 2009; and

[13] D. Tao. *Applied Linkage Synthesis*. Addison-Wesley, Reading, Mass., 1964.

Four-bar mechanisms have been used for path, function, and motion generation tasks. However, single degree of freedom (degree of freedom) closed chain mechanisms like these suffer from the drawback that they can only perform a single motion generation task. If there is a slight change in the required motion generation task then the whole mechanisms of the prior art must be redesigned, sometimes at significant cost and loss of productivity. Moreover, the fewer number of dimensional parameters in a the four-bar mechanisms of the prior art limits the designer's options when motion defects such as branch, order, and circuit defects arise in the motion generator synthesis process. See, for example, Soh and McCarthy [12].

This limitation of single degree of freedom closed chain mechanisms can be overcome by enabling the adjustment of one or more structural parameters (for example, link lengths and pivot locations) of the mechanism. Such mechanisms have been referred to as adjustable mechanisms or adjustable linkages, Tao [13]. Adjustable four-bar mechanisms may enhance the ability to generate various kinds of output motions using the same set of links. They provide not only the flexibility required in many industrial applications, but also high operational speed, high load-bearing and high precision capabilities. Thus, they form a middle ground between conventional closed chain mechanisms and flexible serial chain manipulators. See Chuenchom and Kota [8] and Kota [7]. Chuenchom and Kota [8] called these mechanisms "Programmable Mechanisms" or "Adjustable Robotic Mechanisms (ARMs)". Chuenchom [2] introduced the concept of "soft robots" for industrial applications where a mechanism was used for different motion generation tasks by an adjustment of its parameters. Krovi et al. [10] introduced a single degree of freedom coupled serial chain (SDCSC) in order to simplify the control by coupling the inputs of the serial chain manipulator. Kim [5] discusses the idea of joint un-actuation/actuation to adjust the manipulability and as a result improve the task adaptability of closed chain mechanisms. Kim and Choi [6] have discussed the idea of improved task adaptability of open/closed chain mechanisms through continuous joint mode conversion.

The mechanism reconfiguration discussed herein improves task adaptability, in which the geometry of a mechanism is easily altered depending on the rigid body guidance task to be accomplished. The reconfigurable motion generator of the current invention is capable of generating distinct, separate output motions as desired by a user using a single set of links. The adjustment of one or more parameters of the reconfigurable motion generator facilitates multi-phase motion generation. The reconfigurable motion generator of the current invention derives its name from the definition of a reconfigurable mechanism as discussed by Kuo et al. [11].

As used herein, "brake" or "clutch" refers to a mechanism known by a person of ordinary skill in the art that is mechanically, electrically or electronically controllable so as to prevent or to allow rotation of a revolute joint, in other words to lock a rotating joint into a desired rotary position, as desired by a user. Brakes and clutches are examples of such joint locking mechanisms. Each revolute joint comprising a brake or a clutch is a lockable revolute joint. Each lockable revolute joint of the invention may be independently controllable in order to provide a maximum of reconfiguration possibilities for the user.

As used herein, "driven link" refers to a link having a first end and a second end, where the first end is attached to a rotating means such as, for example, a motor or a hand crank for manual operation. The second end of the driven link may be attached to the first end of a moving link forming a revolute joint. The motor may be controllable to rotate clockwise, counterclockwise, or either clockwise or counterclockwise, and may be caused to rotate or to cease rotation (i.e. lock) by command as desired by user.

As used herein, "moving link" refers to a link having a first end and a second end, each end being rotatably attached to another link, the rotating attachment forming a revolute joint. The invention may comprise any number of moving links, each moving link having a first end rotatably attached to a second end of a preceding link and a second end rotatably attached to a first end of a following link, forming a revolute joint that may comprise a brake and may therefore be a lockable revolute joint.

As used herein, "terminating link" refers to a link having a first end and a second end, the first end being rotatably attached to a second end of a moving link forming a revolute joint, and the second end being rotatably attached to a structure. The structure may be non moving.

Referring now to FIG. 1, the reconfigurable motion generator of the invention represents a new class of mechanical devices conceived to address shortcomings of adjustable linkages. The reconfigurable motion generator of the present invention is capable of configuration changes according to variations in the motion generation requirements. Thus, the reconfigurable motion generator of the present invention bridges the gap between the relatively high flexibility and high cost of totally flexible machines (e.g. industrial robots) and the low flexibility and low cost of fully dedicated mechanisms (e.g. cams and linkages). The current invention overcomes the limitations of the prior art by, among other things, employing planar and/or spherical reconfigurable motion generators for multi-phase motion generation tasks.

Still referring to FIG. 1, the reconfigurable motion generator of the present invention may comprise a driven link 105 having a first end and a second end, a first moving link 106 having a first end and a second end, a second moving link 107 having a first end and a second end, and a terminating link 108 having a first end and a second end, wherein the second end of driven link 105 is rotatably engaged with the first end of first moving link 106 by pin 102 forming a revolute joint A. Likewise, the second end of first moving link 106 is rotatably engaged with the first end of second moving link 107 by pin 103 forming revolute joint B and the second end of second moving link 107 is rotatably engaged with the first end of terminating link 108 by pin 104 forming revolute joint C. The second end of terminating link 108 is rotatably engaged with fixture 110 by pin 101 forming a revolute joint D. Although two moving links are shown in FIG. 1, the reconfigurable motion generator of the present invention may comprise a plurality of moving links of any number as may result from the synthesis of a reconfigurable motion generator designated for a specific application or set of applications, each moving link having a first end and a second end wherein the first end is rotatably attached to a preceding link second end, and the second end is rotatably attached to a following link first end. Fixtures 109 and 110 may be used to attach the reconfigurable motion generator of the invention to a fixed structure or structures, which may be any structure such as a wall, mechanical frame or the like, as may be desired by the user. Drive joint O may be driven rotatably either counterclockwise or clockwise as indicated by arrow E, and may be continuously operated or operated in start/stop fashion, by an electrically or electronically controlled motor (not shown in FIG. 1 but shown in FIGS. 12, 13 and 15b as item 111) that may be affixed to pin 100, which is in turn affixed to the first end of first link 105 forming a revolute joint O. Each of revolute joints A, B, C or D may comprise a brake.

The reconfigurable motion generator of the invention may comprise any number n of moving links, each having a first end and a second end, wherein the first end of each moving link is rotatably attached to a second end of a preceding link, forming a revolute joint, and the second end of each moving link is rotatably attached to a first end of a following link, forming a revolute joint. Thus, the driven link may be followed by n moving links, which may be followed by a terminating link. Each moving link revolute joint may comprise a clutch or brake.

TABLE 1

COMPARISON OF SERIAL CHAIN MANIPULATORS AND CLOSED CHAIN MECHANISMS (Kota [9])

|  | Serial chain manipulators | Closed chain mechanisms |
| --- | --- | --- |
| Advantages | Planning flexibility | High reliability |
|  | Operational flexibility | Low Cost |
|  | Proven off-the-shelf components | Excellent repeatability |
|  | Easier to design | High Speed |
| Disadvantages | High cost | Lack of flexibility |
|  | Poor reliability and repeatability | Difficult to design |
|  | Heavy and slow | Custom construction |

The invention includes the use of revolute joints to effectuate link length and pivot adjustment by adjusting the angle of one or more of the revolute joints in order to achieve different configurations from a single set of links in a given reconfigurable motion generator. This approach is highly favorable over the systems of the prior art, since revolute joints are relatively easy to manufacture and maintain.

Figure 2A:
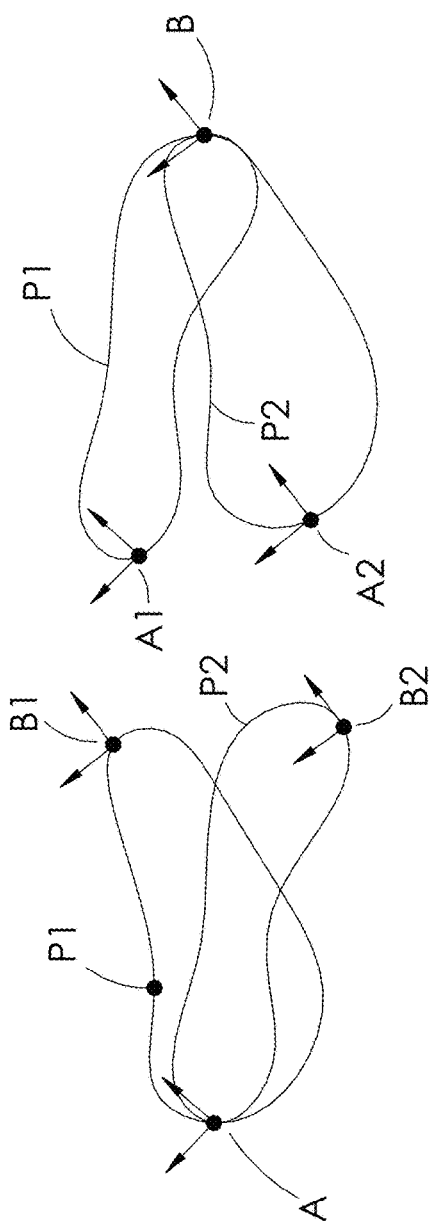
FIG. 2a depicts multi-phase motion generation tasks having a common beginning position and differing end positions.
Figure 2B:
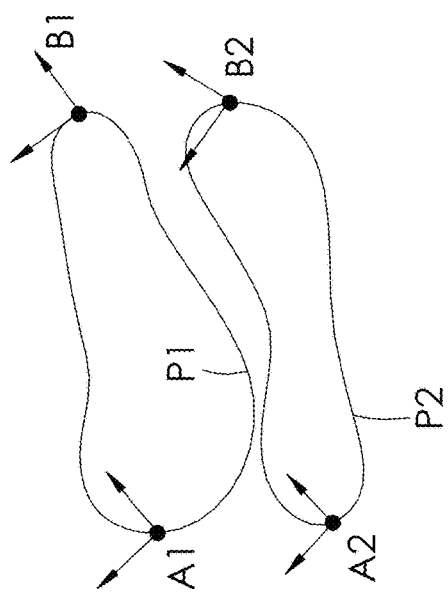
FIG. 2b depicts multi-phase motion generation tasks having differing beginning positions and a common end position.
Figure 2C:
FIG. 2c depicts multi-phase motion generation tasks having differing beginning positions and differing end positions but having common intermediate positions.
Figure 2D:
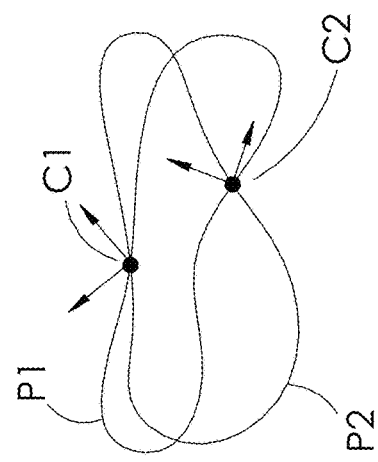
FIG. 2d depicts multi-phase motion generation tasks having differing beginning positions and differing end positions and having no common intermediate positions.

Referring now to FIGS. 2a, 2ab, 2c, and 2d, the adjustability of the reconfigurable motion generator of the present invention allows the invention to be used for different types of motion generation tasks. Such tasks may include, for example and not by way of limitation, tasks having a common start position A but having differing end points B1 and B2, and traversing separate paths P1 and P2, as shown in FIG. 2a; tasks having differing start positions A1 and A2 but having a common end position B, and traversing separate paths P1 and P2, as shown in FIG. 2b; tasks having differing start positions and differing end positions but having common intermediate positions C1 and C2, and traversing separate paths P1 and P2, as shown in FIG. 2c; and distinct motion generation tasks with no common positions in which the tasks has differing starting points A1 and A2, differing end points B1 and B2, and differing paths P1 and P2. This conceptualization of the adjustability of the reconfigurable motion generator of the present invention can be applied towards the synthesis of reconfigurable motion generator of the invention for use in many differing applications involving multi-phase function, path, and motion generation tasks.

In motion generation tasks, the objective is to calculate the mechanism parameters required to achieve or approximate a set of prescribed rigid-body positions. This mechanism design objective is particularly significant when the rigid-body must achieve a specific set of end effector positions for a specific task e.g., a pick-and-place operation.

Figure 3:
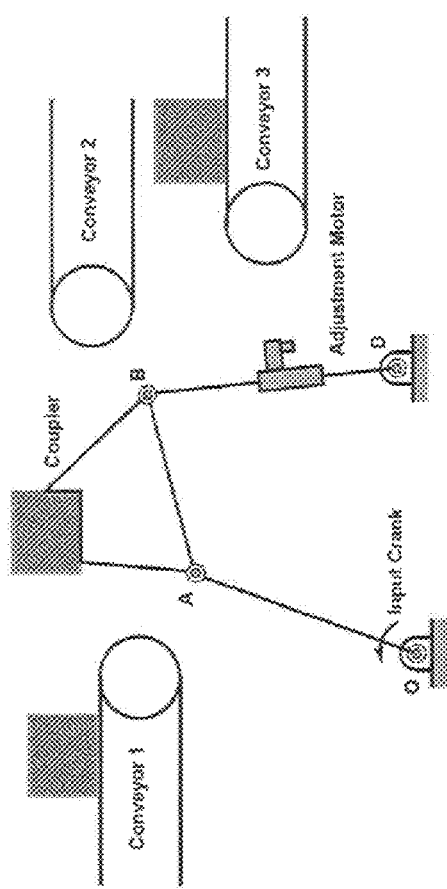
FIG. 3 is a diagram of an adjustable planar linkage of the prior art.

Referring now to FIG. 3, consider the adjustable mechanism suggested for a pick- and-place operation by Chuenchom and Kota [4]. The figure shows two different types of parts being transported from Conveyor 1. Depending on the type of part being transported from Conveyor 1, the mechanism is required to place the part on Conveyor 2 or Conveyor 3. These two distinct pick-and-place operations comprise two different rigid body guidance or motion generation tasks. The solution proposed by Chuenchom and Kota [4] for the task is an adjustable planar four-bar mechanism which can switch between the two tasks by a readjustment of the output link length by means of an adjustment motor. This gives a degree of adjustability to the mechanism and allows it to switch from one configuration to another. However, there are some drawbacks to this system due to the use of the additional actuator such as weight, cost and complexity.

Figure 4:
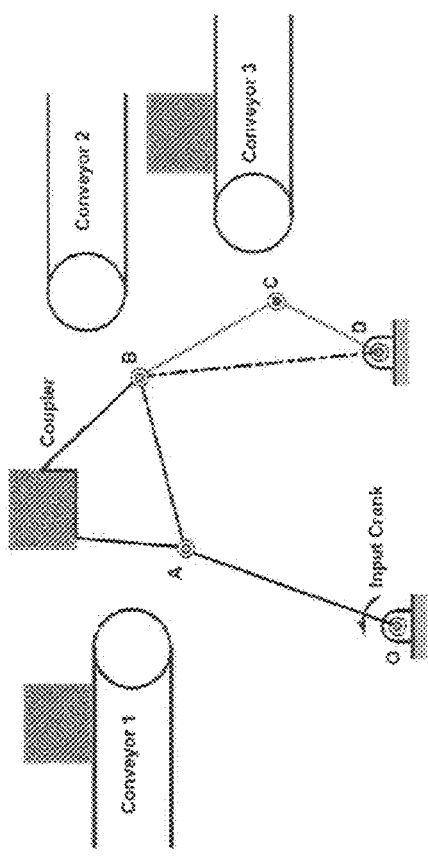
FIG. 4 is a diagram of an exemplary reconfigurable motion generator in accordance with the current invention.

Referring now to FIG. 4, in one embodiment of the invention, the reconfigurable motion generator of the present invention replaces adjustable link BD with an RR dyad comprising two moving links BC and CD. Each of revolute joints A, B, and C may comprise a brake. The resultant mechanism is a two degree of freedom five-bar mechanism. If revolute joint C on the five-bar mechanism is locked, for example by means of an electromagnetic clutch or brake, the five-bar mechanism loses one degree of freedom and is reduced to a four-bar mechanism with effective link BD. The length of the resultant link BD can thus be adjusted by locking revolute joint C at the desired position.

Figure 5:
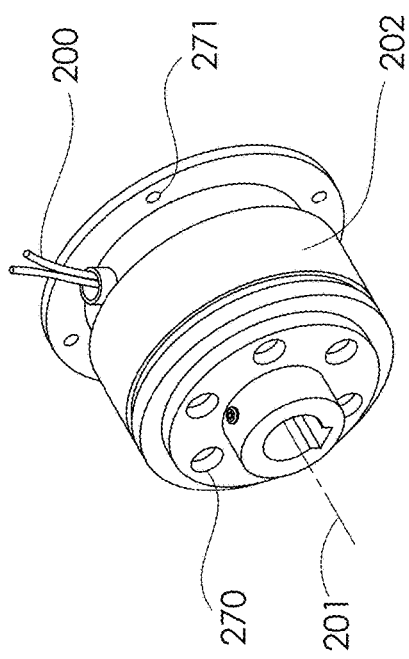
FIG. 5 depicts an exemplary shaft-mount brake.

Referring now to FIG. 5, electromagnetic clutches and brakes such as the one depicted are readily available and can be used in revolute joints of the invention where parameter adjustment is desired. Thus, any one or more, or all, of the revolute joints of the reconfigurable motion generator of the invention may comprise brakes or clutches of any type known in the art; but preferably these joints comprise electromagnetic or any type of electrically or electronically controllable brake or clutch. The use of electromagnetic or any type of electrically or electronically controllable brake or clutch in the joints of the invention has the inherent advantages of speed of control, and hence speed of reconfiguration of the invention, and ease of manufacture. Since the mechanism of the invention does not have a separate adjustment motor for readjustment of the link length, it is significantly lighter and more cost-effective than the link-length adjusting mechanisms of the prior art. Typically the brakes or clutches 202 of the invention comprise an axis of rotation 201, holes or other mechanical means for attachment to a first link 270, holes or other mechanical means for attachment to a second link 271, and wiring 200 to effectuate electrical communication with brake driver circuitry.

Planar RMGs

Referring now to FIGS. 6-11, exemplary four bar embodiments of the reconfigurable motion generator of the present invention are depicted. The embodiments depicted in FIGS. 6-11 are exemplary only, as the reconfigurable motion generator of the present invention may comprise any variation of four bar links or any number of links. FIGS. 6-11 demonstrate the reconfigurability and adaptability of the reconfigurable motion generator of the present invention.

Figure 6:
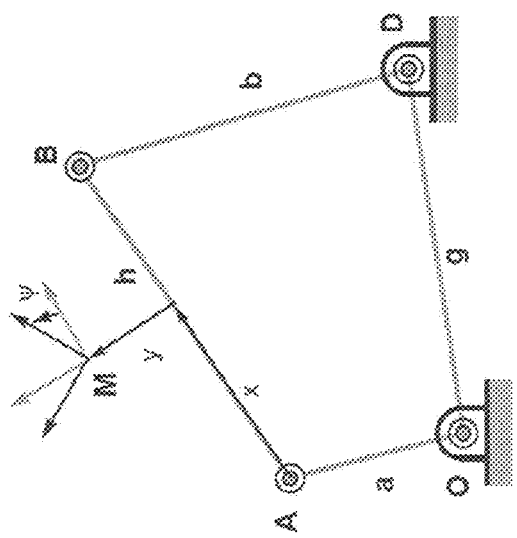
FIG. 6 is an illustration of the parameters of a four-bar mechanism.

Planar four-bar mechanisms may be used for multi-phase motion generation tasks by an adjustment of link lengths and pivot locations. The parameters that can be adjusted in the four-bar mechanism performing motion generation as shown in FIG. 6 are driving fixed revolute joint O; driven moving revolute joint A comprising a brake; driven moving revolute joint B comprising a brake; driven moving revolute joint C comprising a brake; driven fixed revolute joint D comprising; link lengths: input a, output b, coupler h, and fixed g; and attachment of the moving body to the coupler M (x, y, $\psi$).

Figure 7:
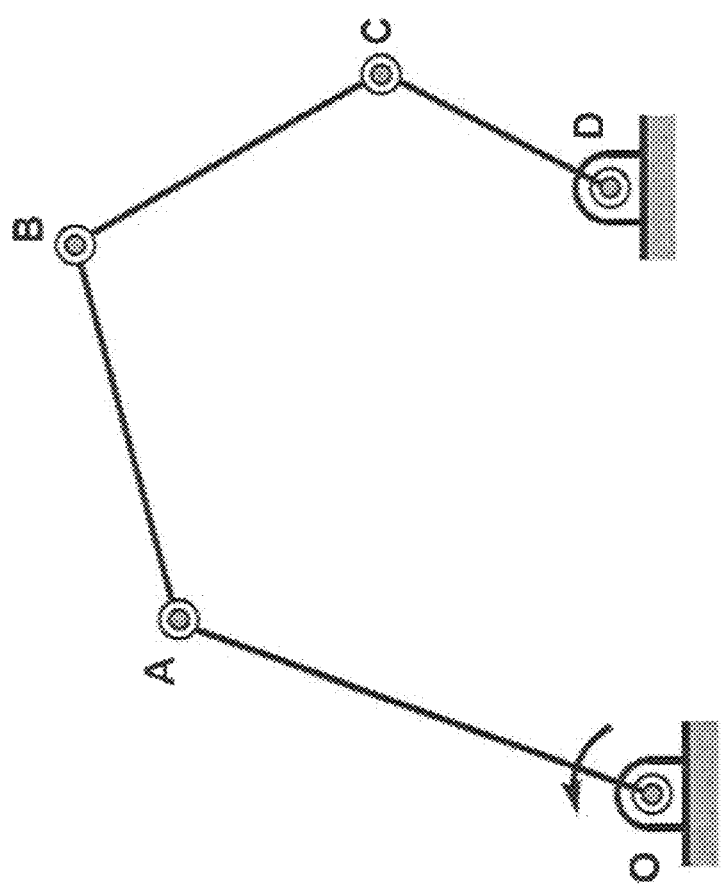
FIG. 7 is an illustrative configuration of one embodiment of the invention.

In order to illustrate the concept of the reconfigurable motion generator of the invention, an exemplary five bar embodiment of the invention OABCD shown in FIG. 7. The mechanism is a planar two degree of freedom mechanism which requires two independent inputs. This mechanism is called the base configuration of the reconfigurable motion generator of the present invention. Each of revolute joints A, B, C and D may comprise a brake. The five-bar mechanism can be constrained in various ways by locking or braking one of the revolute joints A, B, C or D to yield a planar one degree of freedom four-bar mechanism. Thus we can obtain at least four different configurations of the reconfigurable motion generator of the present invention based on which joint is locked.

EXAMPLES

Example 1

Figure 8:
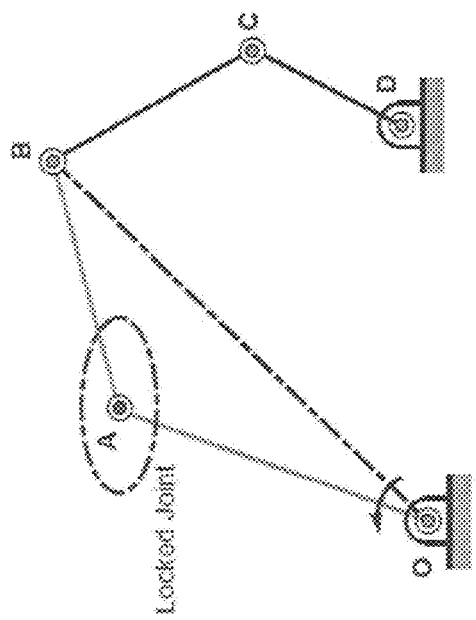
FIG. 8 is an illustrative configuration of one embodiment of the invention as described in Example 1.

An embodiment of a reconfigurable motion generator of the present invention as shown in FIG. 8. In this configuration revolute joint A is locked and link OB becomes the input link of the reconfigurable motion generator of the present invention. Thus, the original two degree of freedom five-bar mechanism is transformed into a one degree of freedom four-bar mechanism OBCD in which the input, output, coupler, and fixed links are OB, CD, BC, and OD respectively. The length of the input link OB may be changed by controlling the position at which joint A is locked by operation of a brake or clutch. This facilitates control over the length of the input link OB depending on the range of OAB. This parameter adjustment can be realized by means of a clutch or brake at joint A.

Example 2

Figure 9:
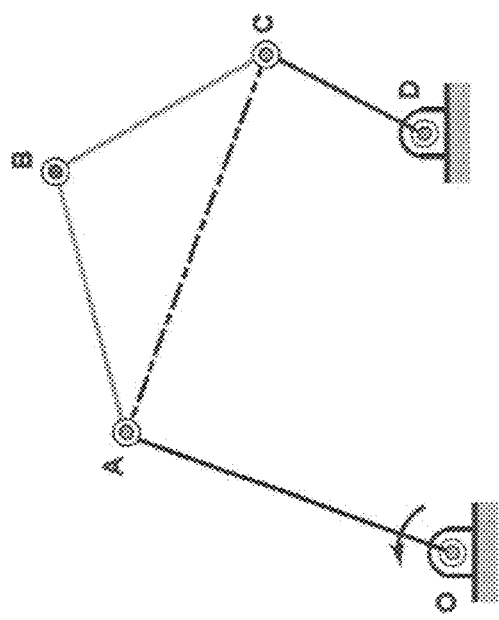
FIG. 9 is an illustrative configuration of one embodiment of the invention as described in Example 2.

A yet further embodiment of a reconfigurable motion generator of the present invention as shown in FIG. 9. In this configuration joint B is locked and link AC becomes the coupler link of the reconfigurable motion generator of the present invention. Thus, the original two degree of freedom five-bar mechanism is transformed into a one degree of freedom four-bar mechanism OACD in which the input, output, coupler, and fixed links are OA, CD, AC, and OD respectively. The length of the coupler link AC may be changed by controlling the position at which joint B is locked by operation of a brake or clutch. This facilitates control over the length of the coupler link AC depending on the range of ABC.

Example 3

Figure 10:
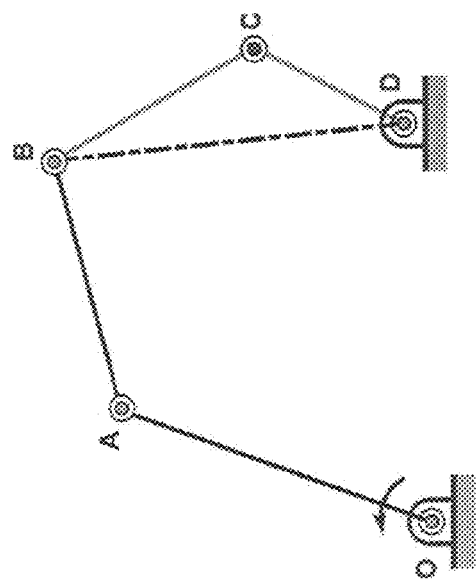
FIG. 10 is an illustrative configuration of one embodiment of the invention as described in Example 3.

A yet further embodiment of a reconfigurable motion generator of the present invention as shown in FIG. 10. In this configuration joint C is locked and link BD becomes the output link of the reconfigurable motion generator of the present invention. Thus, the original two degree of freedom five-bar mechanism is transformed into a one degree of freedom four-bar mechanism OABD in which the input, output, coupler, and fixed links are OA, BD, AB, and OD respectively. The length of the output link BD may be changed by controlling the position at which joint C is locked by operation of a brake or clutch. This facilitates control over the length of the output link BD depending on the range of BCD.

Example 4

Figure 11:
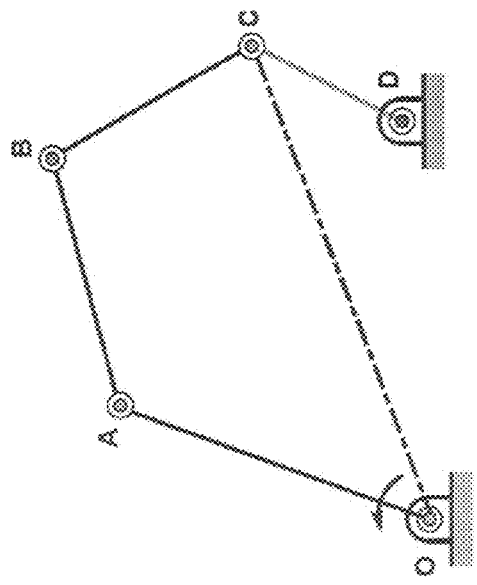
FIG. 11 is an illustrative configuration of one embodiment of the invention as described in Example 4.

Similarly, an embodiment of the reconfigurable motion generator of the present invention is shown in FIG. 11. In this configuration joint D is locked and link OC becomes the fixed link of the reconfigurable motion generator of the present invention. Thus, the original two degree of freedom five-bar mechanism is transformed into a one degree of freedom four-bar mechanism OABC in which the input, output, coupler, and fixed links are OA, BC, AB, and OC respectively. The length of the fixed link OC may be changed by controlling the position at which joint D is locked by operation of a brake or clutch. This facilitates control over the length of the fixed link OC depending on the range of ODC.

The four exemplary configurations of the reconfigurable motion generator of the present invention are summarized in Table 2, where LINK denotes the adjustable link length. From this discussion it follows that a single five-bar mechanism using one driving actuator and four relatively low cost electromagnetic brakes or clutches can be configured to perform multiple sets of motion generation tasks by simple locking or braking of its revolute joints.

TABLE 2

Different Configurations of the Planar RMG

| | Link Parameter | | | |
|---|---|---|---|---|
| Configuration | Input | Output | Coupler | Fixed |
| 1 | OB | CD | BC | OD |
| 2 | OA | CD | AC | OD |
| 3 | OA | BD | AB | OD |
| 4 | OA | BC | AB | PC |

Figure 12:
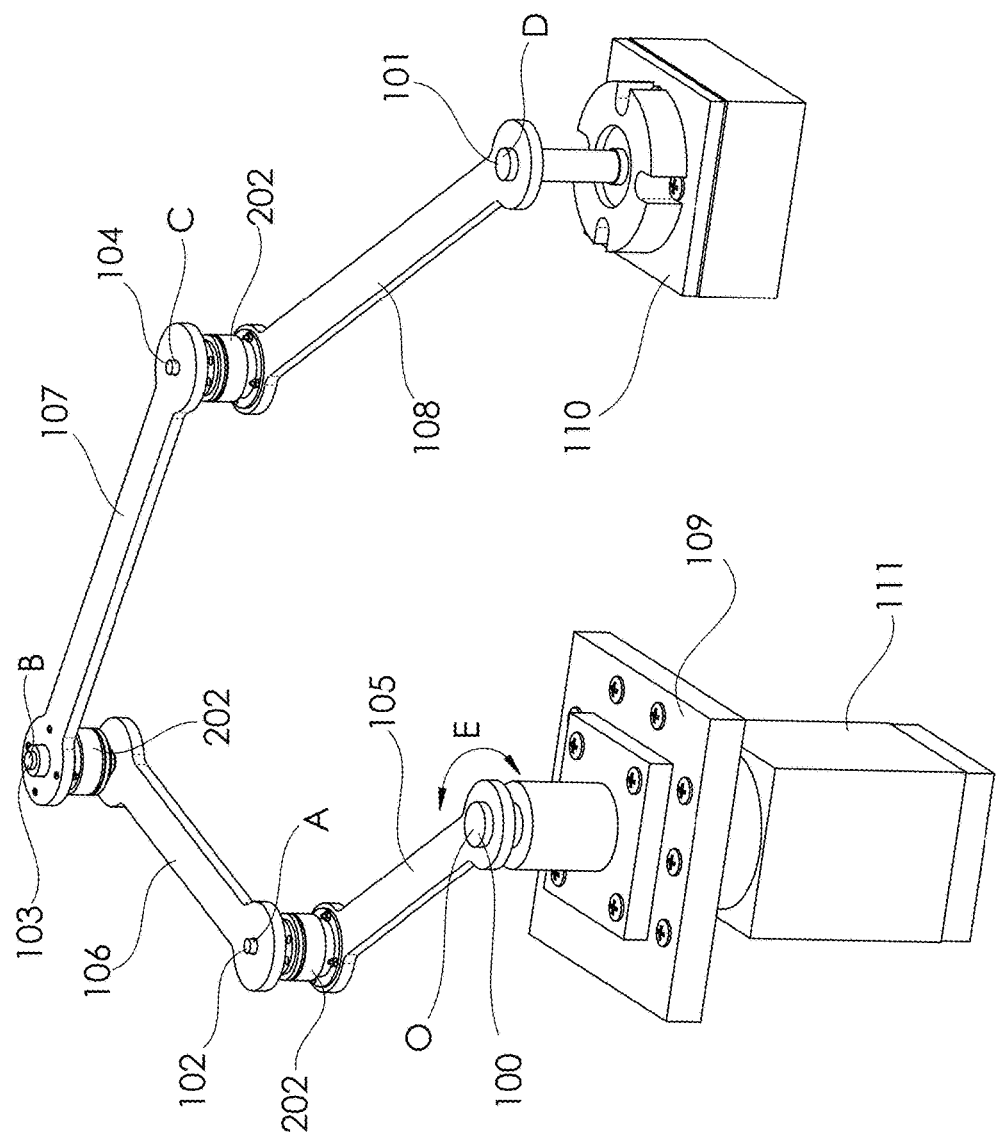
FIG. 12 is an isometric CAD rendering of an exemplary reconfigurable motion generator of the invention comprising four links, revolute joints with brakes, and a motor.
Figure 13:
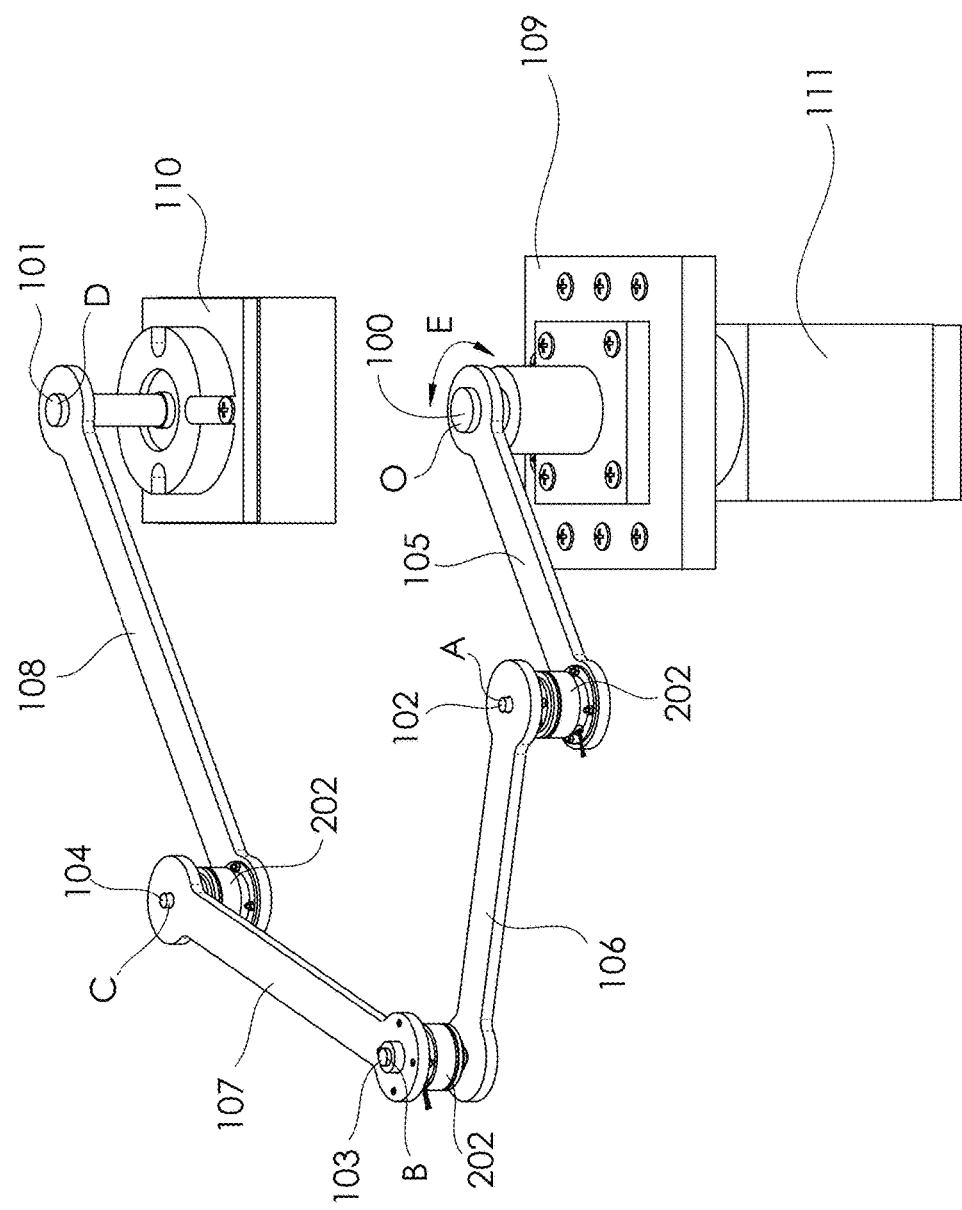
FIG. 13 is an isometric CAD rendering of an exemplary reconfigurable motion generator of the invention comprising four links, revolute joints with brakes, and a motor.
Figure 14:
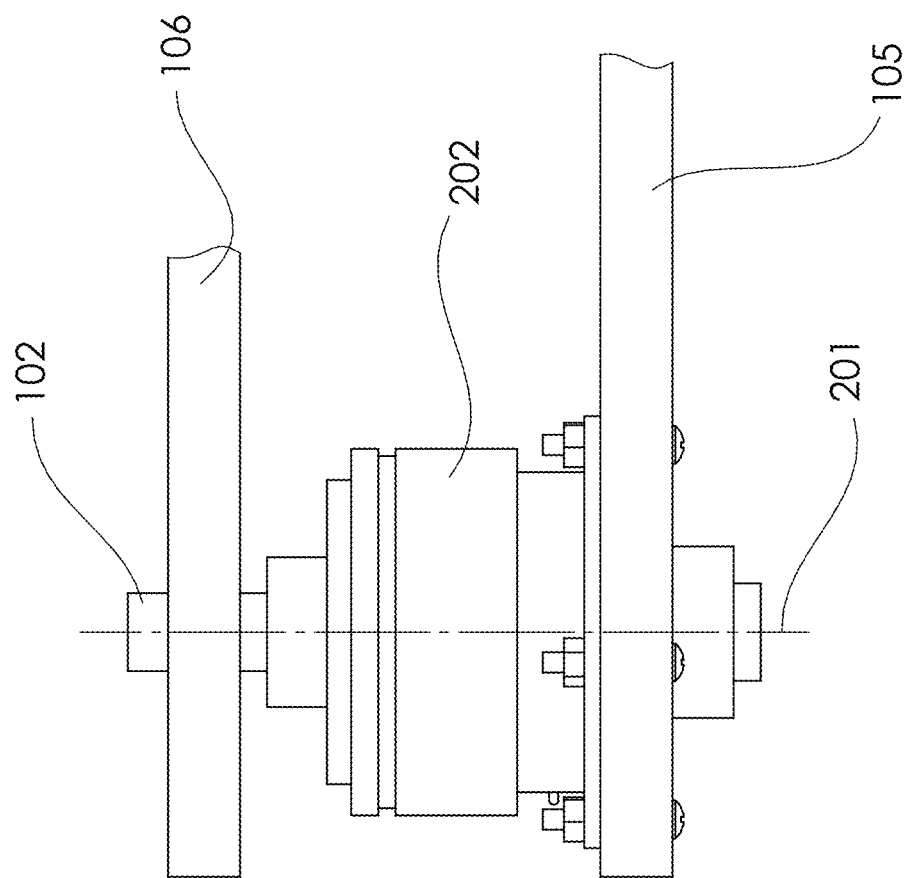
FIG. 14 is a CAD rendering of an illustrative reconfigurable motion generator joint assembly comprising a brake.

An exemplary planar reconfigurable motion generator of the invention according to one of many embodiments of the invention has been designed, fabricated, and tested. The CAD models are shown in FIGS. 12 and 13. FIG. 14 shows an exemplary close-up of an embodiment of the reconfigurable motion generator's moving revolute joint axis and its integrated brake assembly.

Referring now to FIGS. 12 and 13, an isometric CAD rendering of an exemplary reconfigurable motion generator of the invention comprising four links, revolute joints with brakes, and a motor is depicted. The reconfigurable motion generator of the present invention may comprise a driven link 105 having a first end and a second end, a first moving link 106 having a first end and a second end, a second moving link 107 having a first end and a second end, and a terminating link 108 having a first end and a second end, wherein the second end of driven link 105 is rotatably engaged with the first end of first moving link 106 by pin 102 forming a revolute joint A which may further comprise brake 202. Likewise, the second end of first moving link 106 is rotatably engaged with the first end of second moving link 107 by pin 103 forming revolute joint B and the second end of second moving link 107 is rotatably engaged with the first end of terminating link 108 by pin 104 forming revolute joint C. Both revolute joint B and C may further comprise brakes 202, forming lockable revolute joints at B and C. The second end of terminating link 108 is rotatably engaged with fixture 110 by pin 101 forming a revolute joint D which may further comprise brake 202, forming a lockable revolute joint. Fixture 110 may be affixed to a structure, making it non-moving. Although two moving links are shown in FIG. 1, the reconfigurable motion generator of the present invention may comprise a plurality of moving links of any number as may result from the synthesis of a reconfigurable motion generator designated for a specific application or set of applications, each moving link having a first end and a second end wherein the first end is rotatably attached to a preceding link second end, and the second end is rotatably attached to a following link first end. Fixtures 109 and 110 may be used to attach the reconfigurable motion generator of the invention to a fixed structure or structures, which may be any structure such as a wall, mechanical frame or the like, as may be desired by the user. Drive joint O may be driven rotatably either counterclockwise or clockwise as indicated by arrow E, and may be continuously operated or operated in start/stop fashion, by an electrically or electronically controlled motor 111 that may be affixed to pin 100, which is in turn affixed to the first end of first link 105 forming a revolute joint O. Each of revolute joints A, B, C or D may comprise a brake.

Referring now to FIG. 14, an exemplary close-up of an embodiment of the reconfigurable motion generator's moving revolute joint axis and its integrated brake assembly. Pin 102 may rotatably engage the second end of driven link 105 with the first end of moving link 106. Brake 202 may be interposed between and connected to second end of driven link 105 and the first end of moving link 106, so as to allow rotation around axis 201 when the brake is not engaged, but preventing rotation about axis 201 when brake 202 is engaged. This joint is therefore a lockable revolute joint, and is exemplary of the lockable revolute joints of the invention.

Figure 15B:
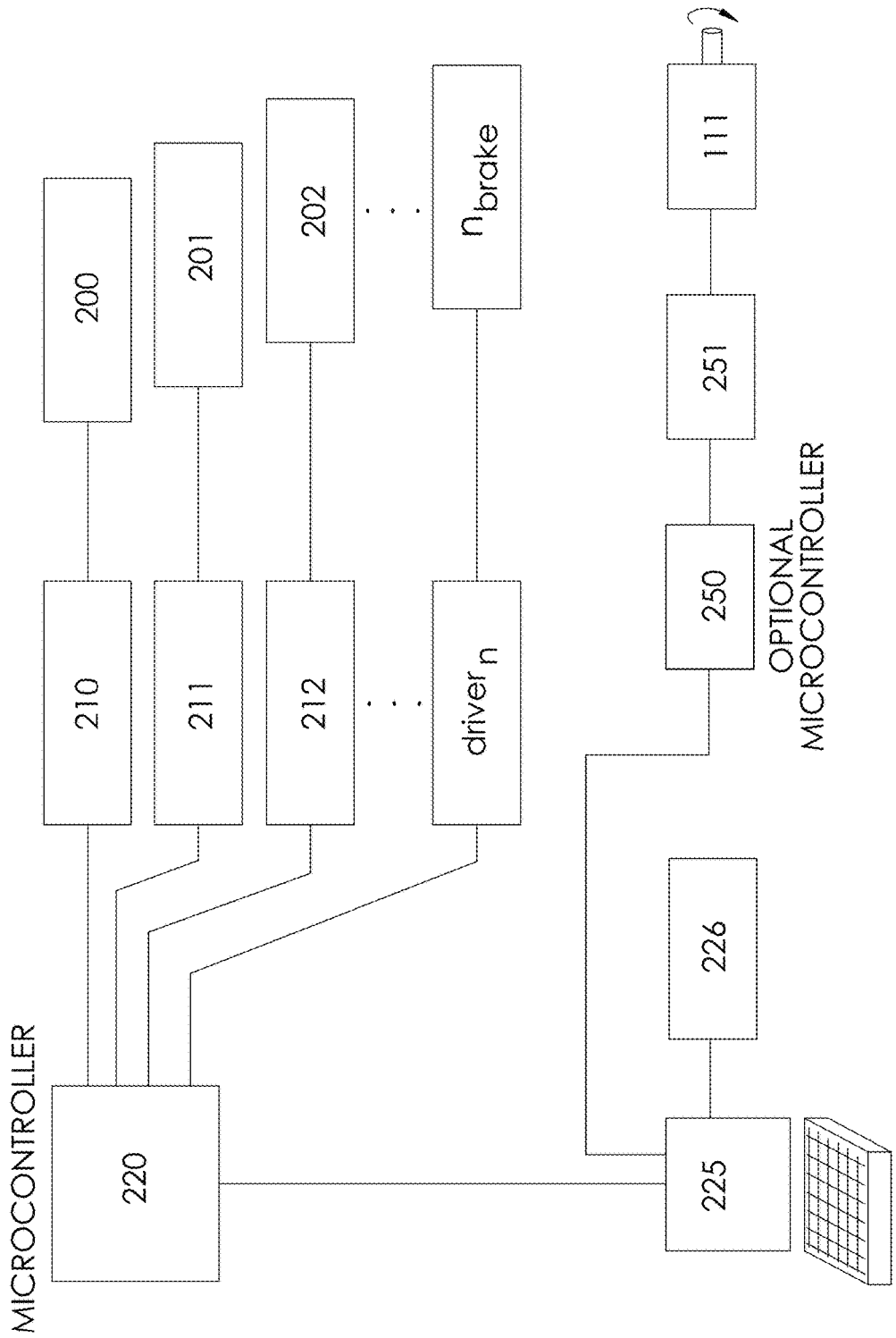
FIG. 15b is an illustrative reconfigurable motion generator control block diagram
Figure 15A:
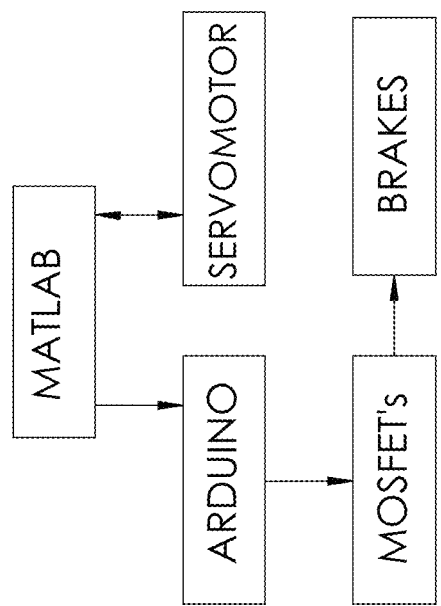
FIG. 15a is an illustrative reconfigurable motion generator control block diagram.

Referring now to FIG. 15a, a basic architecture of the control system for the prototype RMG's one actuator and four brakes is shown. In the prototype system, MATLAB software, running on a standard personal computer, was utilized as the supervisory control program for controlling the reconfigurable motion generator. Custom software may also be used to control the invention. Using MATLAB's serial communication capabilities the MATLAB software communicates bi-directionally to a servo motor that actuates the prototype. In addition, another MATLAB serial interface is used to communicate in one direction from MATLAB to a microcontroller. Any microcontroller may be utilized for controlling the invention, but in the example shown, an Arduino Due microcontroller was utilized. The arduino is used to control four MOSFETS (metal oxide semiconductor field effect transistors) that are connected to its digital outputs. Each MOSFET is used to turn on or off one of the brakes of the invention by energizing or de-energizing the brakes individually as desired. In the exemplary prototype, four brakes were utilized, one at each joint.

Referring now to FIG. 15b, a more detailed block diagram of the control system of the invention is depicted. Computer 225 may execute non-transitory computer readable instructions stored in non-transitory computer readable memory 226, which may be on-board memory in computer 225 or may be external memory in electrical or wireless communication with computer 225. Computer 225 may execute the computer readable instructions causing commands to be sent to microcontroller 220, which is in electrical or wireless communication with computer 225. Microcontroller 220 may then utilize commands received from computer 225 to execute computer non-transitory readable instructions stored in a non-transitory computer readable memory that is in electrical or wireless communication with microcontroller 220, causing drive signals to be sent to each of brake driver circuits 210, 211, 212 through driver$_n$ which are, respectively, in electrical communication with brakes 200, 201, 202, through brake$_n$, where each brake is located at a joint of a reconfigurable motion generator. A user is then able to individually control the brakes located at the joints of the reconfigurable motion generator in order to place the reconfigurable motion generator into a desired configuration for a specific application. Likewise, Computer 225 may execute non-transitory computer readable instructions stored in non-transitory computer readable memory 226, which may be on-board memory in computer 225 or may be external memory in electrical or wireless communication with computer 225 in order to produce motor control signals for controlling motor 111. The motor control signals may be communicated to optional microcontroller 250 which may be in electrical or wireless communication with computer 225. Microcontroller 250 may then utilize motor control signals received from computer 225 to execute computer non-transitory readable instructions stored in a non-transitory computer readable memory that is in electrical or wireless communication with microcontroller 220, causing drive signals to be sent to motor driver 251 which may be in electrical or wireless communication with optional microcontroller 250, and in, turn motor driver 251 may drive motor 111 to rotate counterclockwise, rotate clockwise, or to not rotate as desired by a user. In an alternate embodiment of the invention, motor driver 251 may be in electrical or wireless communication with computer 225, and motor control signals may be communicated directly from computer 225 to motor driver 251.

Spherical RMGs

Figure 16:
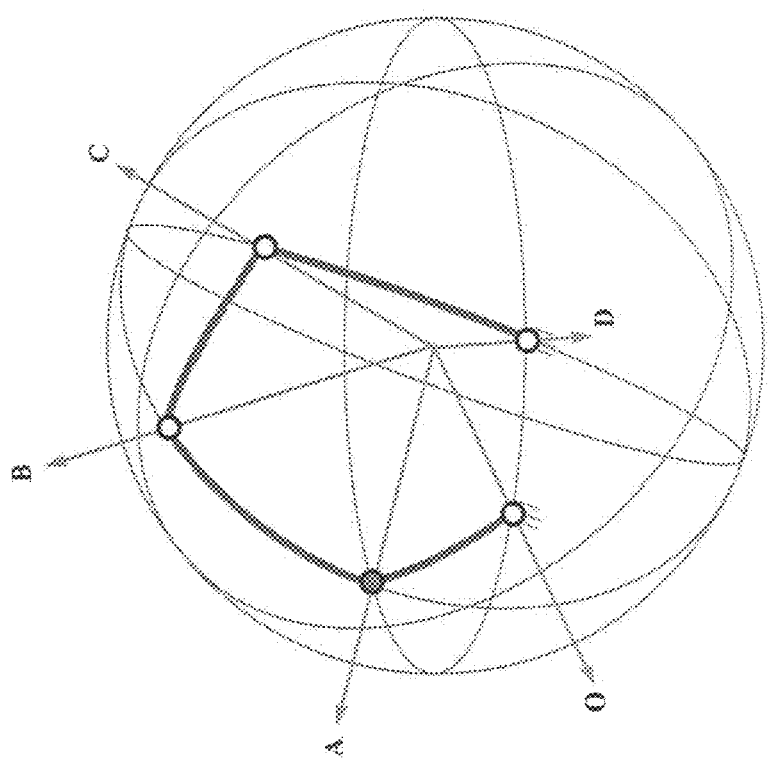
FIG. 16 is a diagram of a spherical reconfigurable motion generator.
Figure 17:
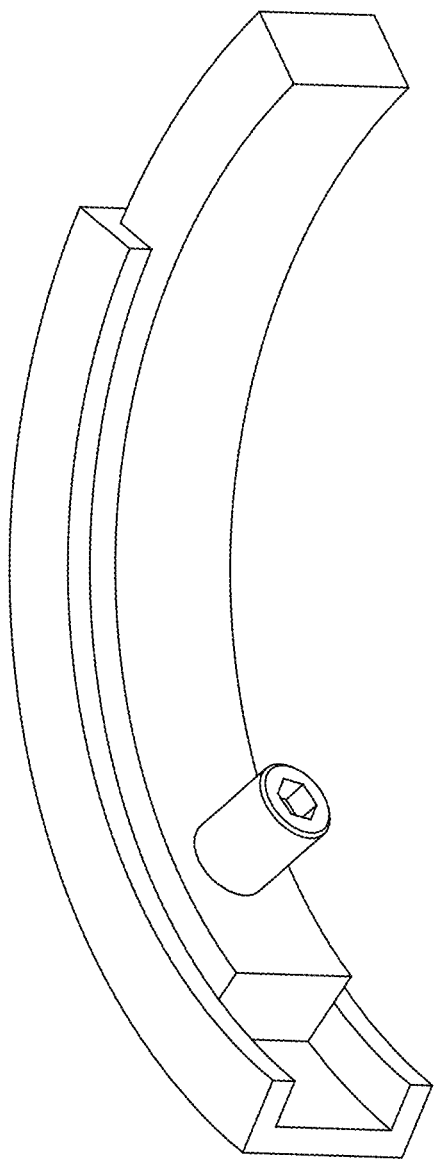
FIG. 17 is an adjustable spherical link of the prior art which can adapted for use with a spherical reconfigurable motion generator in accordance with the current invention.

Referring now to FIG. 16, the principle of a planar reconfigurable motion generator may be extended to the spherical case by replacing the spherical P (prismatic) joint with a spherical RR dyad. This approach is more attractive than the use of an adjustable spherical link as was suggested by Hong and Erdman [1] which is difficult to design and manufacture to minimize the binding and friction in the spherical P joint (see FIG. 17). The spherical reconfigurable motion generator operates on the same principle as a planar reconfigurable motion generator. In FIG. 16, the link length OB, that is to say the angle between the two lines passing through the center of the sphere and the joint axes O and A, may be controlled by locking joint A at the desired position. Thus, the two degree of freedom spherical five-bar mechanism OABCD is reduced to a one degree of freedom four-bar mechanism OBCD in which the input, output, coupler, and fixed links are OB, CD, BC, and OD respectively. Moreover, since the reconfiguration depends only on the locking of pin joints in the mechanism, the four different configurations of the spherical reconfigurable motion generator are easily attained.

Reconfigurable motion generators are a new concept for a highly flexible and adaptable class of machines capable of achieving a variety of motion generation tasks. They possess the inherent advantages of closed chain mechanisms which makes them attractive for motion generation tasks involving part families of products. Additional applications include the development of a general methodology for dimensional synthesis of reconfigurable motion generators for multi-phase motion generation. In order to attain this objective, determination of the optimum joint locking sequence and limits of attainable link lengths for each configuration need to be determined. The dimensional synthesis process also requires determining the feasibility of various configurations of the reconfigurable motion generator to avoid motion defects such as order, branch, and circuit.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:
1. A reconfigurable motion generator, comprising:
   a motor having a rotatable shaft, said motor attached to a fixed structure;
   a series of links, comprising:
      a driven link having a first end and a second end, said first end being attached to said motor shaft;
      a plurality of moving links, each link of said plurality of moving links having a first end rotatably attached to a second end of a preceding link forming a revolute joint, and a second end rotatably attached to a first end of a following link, also forming a revolute joint; and a terminating link having a first end and a second end;

wherein said driven link first end is attached to said rotatable shaft of said motor so that said driven link is caused to rotate when said motor shaft rotates, and wherein said driven link second end is rotatably attached to a first end of said at least one moving link forming a revolute joint; and wherein said terminating link first end is rotatably attached to a second end of said at least one moving link forming a revolute joint, and wherein said second end of said terminating link is rotatably attached to a structure that is fixed relative to said fixed structure; and wherein each link of said plurality of moving links is translated in relation to said fixed structure when said motor shaft is rotated; and wherein at least one of said revolute joints further comprises a brake, said brake having a locked position preventing said revolute joint from rotating, forming a lockable revolute joint.

2. The reconfigurable motion generator of claim 1, wherein said at least one revolute joint brake is electrically controllable.

3. The reconfigurable motion generator of claim 1, wherein said at least one of said revolute joints further comprising a brake is further defined as a plurality of said revolute joints further comprising a brake having a locked position, forming a plurality of lockable revolute joints.

4. The reconfigurable motion generator of claim 3, wherein each of said revolute joint brakes is independently electrically controllable.

5. The reconfigurable motion generator of claim 1, wherein said at least one moving link is further defined as a first moving link and a second moving link, and wherein said first end of said first moving link is rotatably attached to said second end of said driven link forming a first revolute joint, and wherein said second end of said first moving link is rotatably attached to said first end of said second moving link forming a second revolute joint, and wherein said second end of said second moving link is rotatably attached to said first end of said terminating link, forming a third revolute joint.

6. The reconfigurable motion generator of claim 5, wherein said at least one revolute joint brake is electrically controllable.

7. The reconfigurable motion generator of claim 5, wherein said at least one of said revolute joints further comprising a brake is further defined as a plurality of said revolute joints further comprising a brake having a locked position, forming a plurality of lockable revolute joints.

8. The reconfigurable motion generator of claim 5, wherein all of said brakes are electrically controllable.

9. The reconfigurable motion generator of claim 1, wherein the reconfigurable motion generator is a planar motion generator.

10. The reconfigurable motion generator of claim 1, wherein the reconfigurable motion generator is a spherical motion generator.

11. The reconfigurable motion generator of claim 1, further comprising a computer in electrical communication with each of said brakes, and wherein said computer further comprises computer readable non-transitory instructions for controlling each of said brakes to either a locked or unlocked state.

12. The reconfigurable motion generator of claim 2, further comprising a computer in electrical communication with each of said brakes, and wherein said computer further comprises computer readable non-transitory instructions for controlling each of said brakes to either a locked or unlocked state.

13. The reconfigurable motion generator of claim 3, further comprising a computer in electrical communication with each of said brakes, and wherein said computer further comprises computer readable non-transitory instructions for controlling each of said brakes to either a locked or unlocked state.

14. The reconfigurable motion generator of claim 4, further comprising a computer in electrical communication with each of said brakes, and wherein said computer further comprises computer readable non-transitory instructions for controlling each of said brakes to either a locked or unlocked state.

15. The reconfigurable motion generator of claim 5, further comprising a computer in electrical communication with each of said brakes, and wherein said computer further comprises computer readable non-transitory instructions for controlling each of said brakes to either a locked or unlocked state.

16. The reconfigurable motion generator of claim 6, further comprising a computer in electrical communication with each of said brakes, and wherein said computer further comprises computer readable non-transitory instructions for controlling each of said brakes to either a locked or unlocked state.

17. The reconfigurable motion generator of claim 7, further comprising a computer in electrical communication with each of said brakes, and wherein said computer further comprises computer readable non-transitory instructions for controlling each of said brakes to either a locked or unlocked state.

18. The reconfigurable motion generator of claim 8, further comprising a computer in electrical communication with each of said brakes, and wherein said computer further comprises computer readable non-transitory instructions for controlling each of said brakes to either a locked or unlocked state.

19. The reconfigurable motion generator of claim 9, further comprising a computer in electrical communication with each of said brakes, and wherein said computer further comprises computer readable non-transitory instructions for controlling each of said brakes to either a locked or unlocked state.

20. The reconfigurable motion generator of claim 10, further comprising a computer in electrical communication with each of said brakes, and wherein said computer further comprises computer readable non-transitory instructions for controlling each of said brakes to either a locked or unlocked state.

* * * * *